United States Patent
Shen

(10) Patent No.: US 12,461,837 B2
(45) Date of Patent: Nov. 4, 2025

(54) HANDSHAKING METHOD AND DATA STORAGE SYSTEM

(71) Applicant: SILICON MOTION, INC., Zhubei (TW)

(72) Inventor: Shih-Hsiang Shen, Zhubei (TW)

(73) Assignee: SILICON MOTION, INC., Zhubei (TW)

(*) Notice: Subject to any disclaimer, the term of this patent is extended or adjusted under 35 U.S.C. 154(b) by 8 days.

(21) Appl. No.: 18/404,870

(22) Filed: Jan. 4, 2024

(65) Prior Publication Data

US 2024/0354212 A1    Oct. 24, 2024

(51) Int. Cl.
  *G06F 11/27*   (2006.01)
  *G06F 11/22*   (2006.01)
  *G06F 11/263*  (2006.01)
  *G06F 13/16*   (2006.01)

(52) U.S. Cl.
  CPC .......... *G06F 11/27* (2013.01); *G06F 11/2268* (2013.01); *G06F 11/263* (2013.01); *G06F 13/1673* (2013.01)

(58) Field of Classification Search
  CPC .. G06F 13/1673; G06F 11/27; G06F 11/2268; G06F 11/263; G06F 3/0656; G06F 3/0679; G06F 3/0659
  See application file for complete search history.

(56) References Cited

U.S. PATENT DOCUMENTS

| | | | |
|---|---|---|---|
| 10,496,281 B2 * | 12/2019 | Jeong | G06F 3/0679 |
| 10,613,778 B2 | 4/2020 | Hahn et al. | |
| 10,983,722 B2 * | 4/2021 | Kim | H04L 9/3247 |
| 12,045,516 B2 * | 7/2024 | Benisty | G06F 3/061 |
| 2016/0026406 A1 * | 1/2016 | Hahn | G06F 3/0685 711/103 |
| 2018/0136875 A1 * | 5/2018 | Nimmagadda | G06F 3/0659 |
| 2019/0114276 A1 * | 4/2019 | Hodes | G06F 13/4027 |
| 2020/0151040 A1 * | 5/2020 | Lee | G06F 11/0727 |
| 2021/0216240 A1 * | 7/2021 | Matsunaga | G06F 3/0679 |

FOREIGN PATENT DOCUMENTS

| | | |
|---|---|---|
| CN | 115963982 A | 4/2023 |
| TW | 202143035 A | 11/2021 |
| TW | 202240407 A | 10/2022 |
| TW | 202314488 A | 4/2023 |

* cited by examiner

Primary Examiner — Albert Decady
Assistant Examiner — Grace V Braden

(57) ABSTRACT

Disclosed is a handshaking method applied to a data storage system including a host system and a data storage device. The handshaking method includes the following steps: applying for a host memory buffer from the host system by the data storage device; transmitting, by the host system, a command descriptor to the host memory buffer, so that the data storage device performs standalone behavior based on the command descriptor in the host memory buffer, and transmits an operation log corresponding to the standalone behavior to the host memory buffer; and continuously monitoring, by the host system, the host memory buffer until the data storage device completes the standalone behavior and transmits a response descriptor to the host memory buffer. Therefore, the host memory buffer is used as a communication interface between the host system and the data storage device, so that the data storage device can perform more diverse operations.

12 Claims, 4 Drawing Sheets

HANDSHAKING METHOD AND DATA STORAGE SYSTEM

CROSS REFERENCE TO RELATED PRESENT DISCLOSURE

This application claims the priority benefit of Taiwan Patent Application Serial Number 112114745, filed on Apr. 20, 2023, the full disclosure of which is incorporated herein by reference.

BACKGROUND

Technical Field

The present disclosure relates to a memory buffer allocation technology, and in particular, to a handshaking method and a data storage system using a host memory buffer as a communication interface.

Related Art

In recent years, with the rapid evolution of memory technology, various data storage devices, such as universal flash storages (UFSs) and solid-state drives (SSDs), are widely used in various purposes.

Generally speaking, the host system accesses the data storage device through a transmission interface that meets specification. For example, the host system transmits a non-volatile memory express (NVMe) command to the solid-state drive through the peripheral component interconnect express (PCIe) bus, so that the solid-state drive performs the corresponding operation. However, the data storage device has the problem of poor operation speed caused by the limited form of command transmission.

Therefore, how to provide a handshaking method and a data storage system to solve the above-mentioned problem is a problem that those skilled in the art need to solve.

SUMMARY

The embodiments of the present disclosure provide a handshaking method and a data storage system, which can solve the problem of poor operation speed caused by the limited form of command transmission in existing data storage devices.

In order to solve the above-mentioned technical problem, the present disclosure is implemented as follows:

The present disclosure provides a handshaking method, applied to a data storage system, wherein the data storage system includes a host system and a data storage device. The handshaking method includes the following steps: applying for a host memory buffer from the host system by the data storage device; transmitting, by the host system, a command descriptor to the host memory buffer, so that the data storage device performs standalone behavior based on the command descriptor in the host memory buffer, and transmits an operation log corresponding to the standalone behavior to the host memory buffer; and continuously monitoring, by the host system, the host memory buffer until the data storage device completes the standalone behavior and transmits a response descriptor to the host memory buffer.

The present disclosure further provides a data storage system, which includes a host system and a data storage device, and the data storage device is coupled to the host system. The host system is configured to transmit a command descriptor to a host memory buffer, and continuously monitor the host memory buffer until the host memory buffer is filled with a response descriptor. The data storage device is configured to apply for the host memory buffer from the host system, perform standalone behavior based on the command descriptor in the host memory buffer, and then transmit an operation log correspondingly generated to the host memory buffer, and transmit the response descriptor to the host memory buffer after completing the standalone behavior.

In the handshaking method and the data storage system of the embodiments of the present disclosure, the host memory buffer can be used as a communication interface between the host system and the data storage device, so that the transmission of commands is no longer limited to a specific transmission form, as a result, the data storage device can perform more diverse operations.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Figure 1:
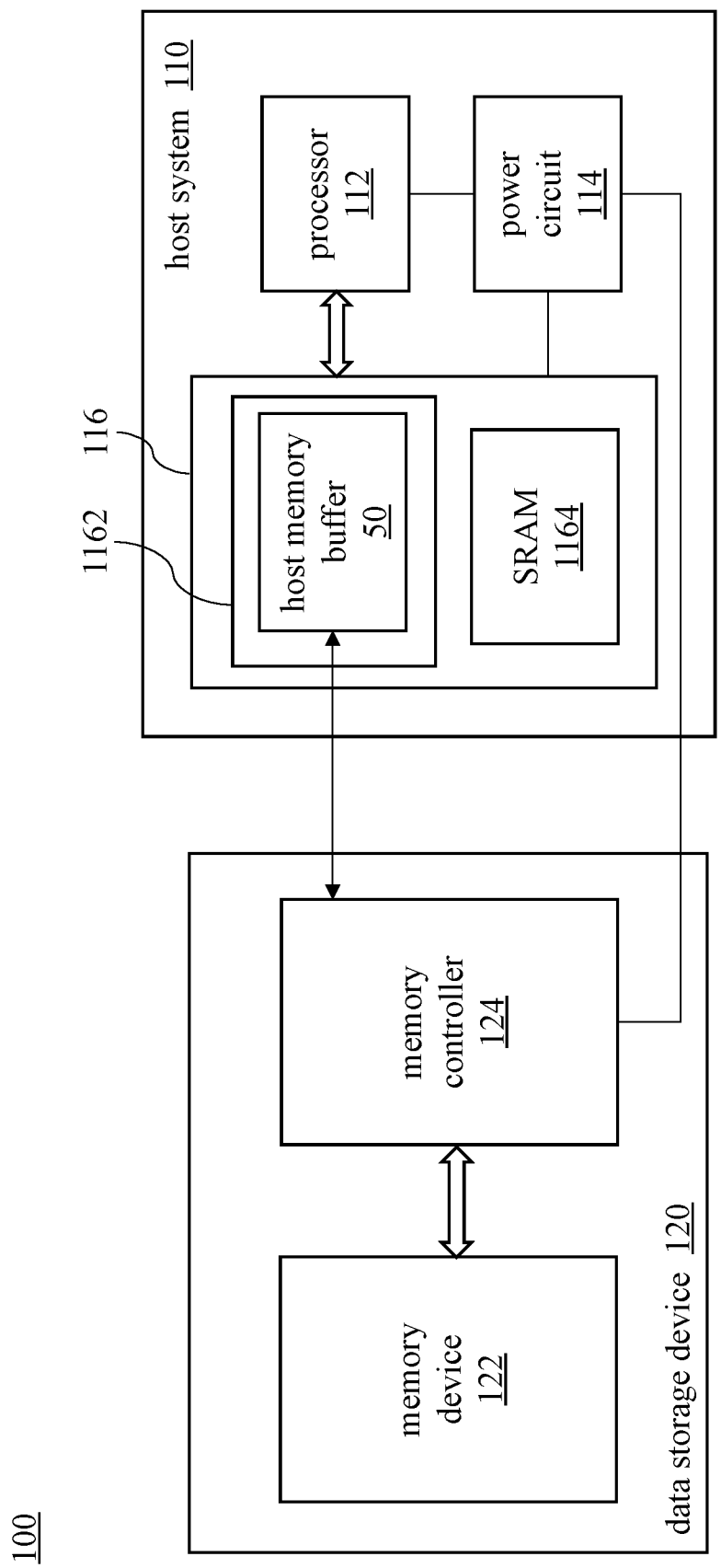
FIG. 1 is a block diagram of a data storage system according to an embodiment of the present disclosure.

Please refer to FIG. 1, which is a block diagram of a data storage system according to an embodiment of the present disclosure. As shown in FIG. 1, a data storage system 100 comprises a host system 110 and a data storage device 120, and the data storage device 120 is coupled to the host system 110. The host system 110 may comprise a processor 112, a power circuit 114 and a random access memory (RAM) 116, and the random access memory 116 may comprise a dynamic random access memory (DRAM) 1162 and a static random access memory (SRAM) 1164. The processor 112 and the random access memory 116 can be connected to each other through the bus, the processor 112 can control the overall operation of the host system 110, and the power circuit 114 can supply power to the processor 112 and the random access memory 116. The data storage device 120 may comprise a memory device 122 and a memory controller 124, and the memory controller 124 is configured to access the memory device 122 and control the operation of the memory device 122. The memory device 122 can be a non-volatile memory (NVM) device such as a NAND flash memory and a NOR flash memory. The data storage device 120 can obtain the required power from the power circuit 114 of the host system 110, provide storage space for the host system 110, and support a host memory buffer (HMB) function.

In one embodiment, the memory controller 124 communicates with the processor 112 of the host system 110 using a standard communication protocol, wherein the standard communication protocol may comprise but not limited to the universal serial bus (USB) standard, the universal flash storage (UFS) interface standard, the advanced technology attachment (ATA) standard, the serial ATA (SATA) standard, and/or the peripheral component interconnect express (PCIe) standard.

In one embodiment, the host system 110 can be an electronic device coupled to the data storage device 120, such as a mobile phone, a notebook computer, and a desktop computer. In another embodiment, the data storage device 120 may be a solid-state drive or an embedded storage device conforming to the UFS specification, and may be disposed in an electronic device, and the host system 110 may be a processor of the electronic device.

In this embodiment, the host system 110 is configured to transmit a command descriptor to the host memory buffer 50, and to continuously monitor the host memory buffer 50 until the host memory buffer 50 is filled with a response descriptor. The data storage device 120 is configured to apply for the host memory buffer 50 from the host system 110, perform standalone behavior based on the command descriptor in the host memory buffer 50, and then transmit an operation log correspondingly generated to the host memory buffer 50, and transmit the response descriptor to the host memory buffer 50 after completing the standalone behavior.

The host system 110 can configure continuous physical addresses in the dynamic random access memory 1162 according to the memory configuration parameter of the data storage device 120 coupled thereto, so as to serve as the host memory buffer 50 to the data storage device 120. The data storage device 120 may access the host memory buffer 50 after receiving a command from the host system 110 indicating that the host memory buffer 50 is accessible. In one embodiment, the data storage device 120 can request the host system 110 to allocate the host memory buffer 50 in the DRAM 1162 to the data storage device 120 through the PCIe interface according to the NVMe protocol.

The host memory buffer 50 can be provided to the data storage device 120 as an extended memory, and the host system 110 handshakes with the data storage device 120 through the host memory buffer 50. Specifically, the host system 110 can directly transmit the command descriptor for the data storage device 120 to perform related operation to the host memory buffer 50 for storage; the data storage device 120 can access the command description in the host memory buffer 50 to perform standalone behavior corresponding thereto, generate the corresponding operation log during the operation, and transmit the operation log to the host memory buffer 50 for storage; after transmitting the command descriptor to the host memory buffer 50, the host system 110 continuously monitors the host memory buffer 50 to monitor the current operating status of the data storage device 120 in real time from the operation log in the host memory buffer 50; the data storage device 120 transmits the corresponding response descriptor to the host memory buffer 50 for storage after completing the standalone behavior, so that the host system 110 stops monitoring the host memory buffer 50 when the host memory buffer 50 is filled with the response descriptor.

Therefore, the host memory buffer can be used as a communication interface between the host system and the data storage device, so that the transmission of commands is no longer limited to a specific transmission form (that is, it is not limited to the original way of transmitting commands between the host system 110 and the data storage device 120), as a result, the data storage device 120 can perform more diverse operations.

Figure 2:
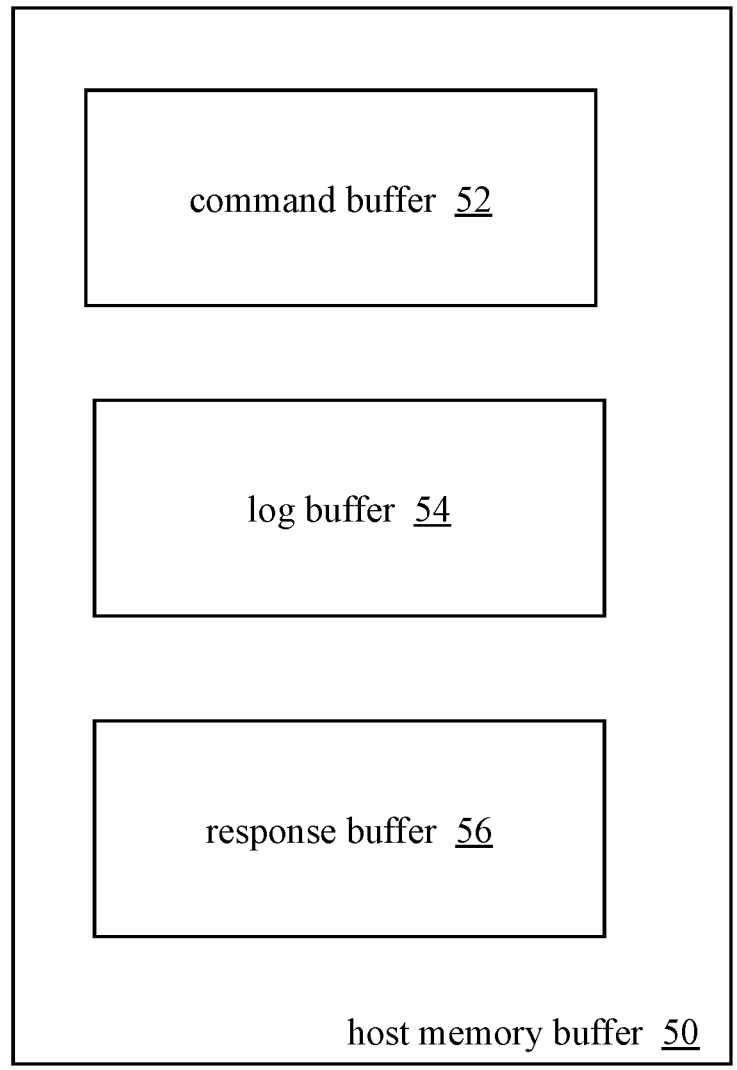
FIG. 2 is a schematic diagram of an embodiment of the host memory buffer of FIG. 1.

In one embodiment, the host memory buffer 50 may comprise a command buffer 52, a log buffer 54 and a response buffer 56 as shown in FIG. 2, which is a schematic diagram of an embodiment of the host memory buffer of FIG. 1. Therefore, the host system 110 can transmit the command descriptor to the command buffer 52, so that the data storage device 120 can perform standalone behavior based on the command descriptor in the command buffer 52, generate an operation log corresponding thereto, and immediately transmit the operation log to the log buffer 54; the host system 110 continuously monitors the log buffer 54 after transmitting the command descriptor to the command buffer 52, so as to monitor the current operating status of the data storage device 120 in real time from the operation log in the log buffer 54; the data storage device 120 transmits the response descriptor corresponding thereto to the response buffer 56 for storage after completing the standalone behavior, so that the host system 110 stops monitoring the log buffer 54 when the response buffer 56 is filled with the response descriptor.

In one embodiment, the data storage system 100 can be applied to a scenario where the host system 110 controls the data storage device 120 to execute a self-test operation, wherein the host memory buffer 50 can comprises a command buffer 52, a log buffer 54 and a response buffer 56. Specifically, the host system 110 can transmit a test command to the command buffer 52; the data storage device 120 can extract the test command in the command buffer 52 and then execute a self-test operation, generate test information, and transmit the test information to the log buffer 54; the host system 110 continuously monitors the log buffer 54 after transmitting the test command to the command buffer 52, so as to monitor the current test status of the data storage device 120 in real time from the test information in the log buffer 54; the data storage device 120 transmit the corresponding test result to the response buffer 56 for storage after completing the self-test operation (that is, the data storage device 120 updates the test result in the response buffer 56 after the self-test operation is completed), so that the host system 110 stops monitoring the log buffer 54 when the test result of the response buffer 56 is updated. Each piece of test information may comprise the test result and pattern of a test loop in the self-test operation. The self-test operation may be but not limited to a NAND flash memory test or a memory test, and can be designed and adjusted according to actual needs. Therefore, the host memory buffer 50 is used as a communication interface between the host system 110 and the data storage device 120, and the host system 110 transmits a test command to the command buffer 52 to make the data storage device 120 perform a self-test operation, so that the data storage device 120 can perform a debugging operation.

Figure 3:
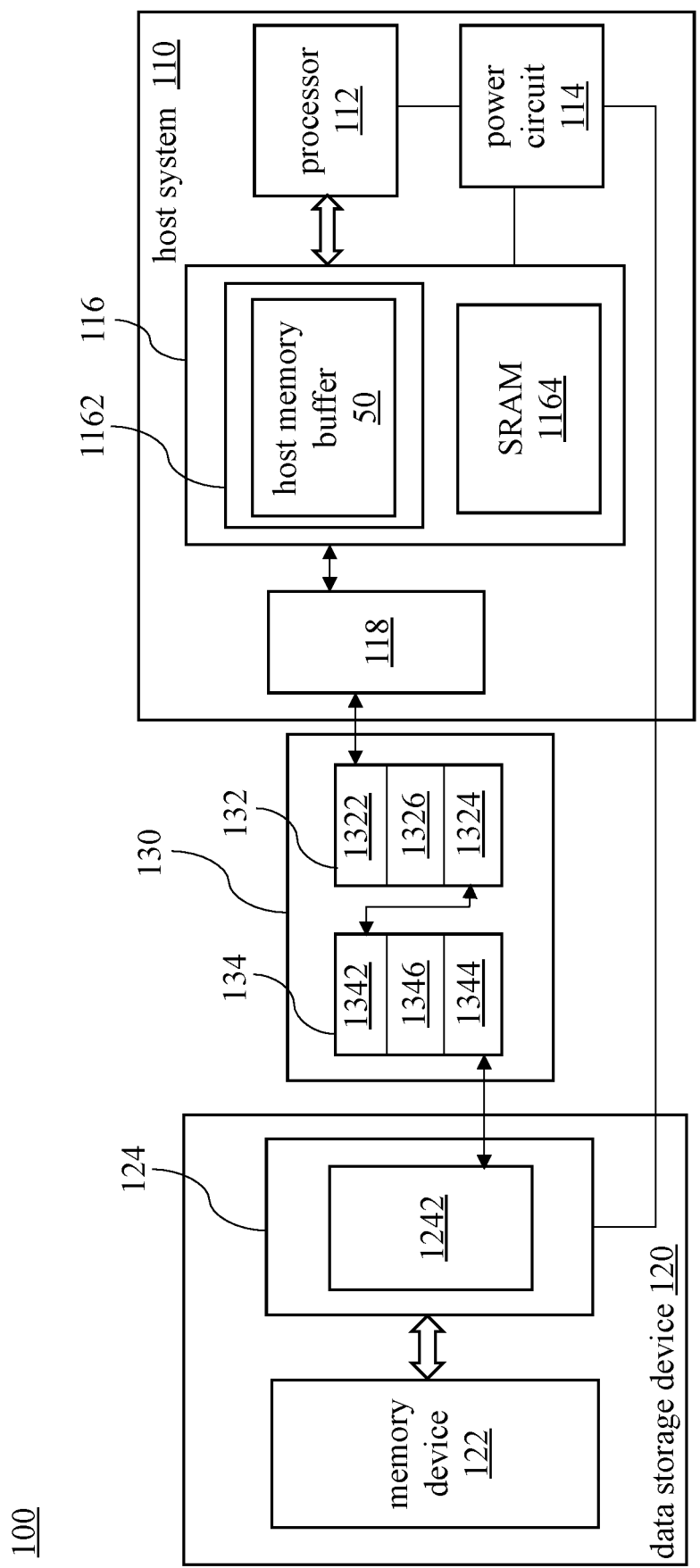
FIG. 3 is a block diagram of a data storage system according to another embodiment of the present disclosure.

If the host system 110 is equipped with a transmission interface that can support the transmission specification of the data storage device 120 (e.g., the data storage device 120 is a UFS device, and the host system 110 is equipped with the transmission interface that support the UFS interface standard), the host system 110 can directly access the data storage device 120 through the transmission interface, and the data storage device 120 can also access the host memory buffer 50 through the transmission interface. If the host system 110 is not equipped with a transmission interface that can support the transmission specification of the data storage device 120, the host system 110 must access the data storage device 120 through a specific bridge device, and the data storage device 120 must access the host memory buffer 50 through the specific bridge device. Please refer to FIG. 3, which is a block diagram of a data storage system according to another embodiment of the present disclosure. As shown in FIG. 3, in addition to the host system 110 and the data storage device 120, the data storage system 100 may further comprise a bridge device 130. The bridge device 130 is coupled with the data storage device 120 and the host system 110. The data storage device 120 may further comprise a first transmission interface 1242 (that is, the memory controller 124 comprises the first transmission interface 1242), the host system 110 may further comprise a second transmission interface 118, the second transmission interface 118 is coupled to the host memory buffer 50, and a communication protocol corresponding to the first transmission interface 1242 is different from a communication protocol corresponding to the second transmission interface 118. The data storage device 120 can communicate with the host system 110 with the second transmission interface 118 via the bridge device 130 through the first transmission interface 1242, and access the host memory buffer 50. That is to say, the bridge device 130 can be configured to transmit data and signals between the data storage device 120 and the host system 110, so as to assist the host system 110 in accessing the data storage device 120, and assist the data storage device 120 in accessing the host memory buffer 50.

In one embodiment, the bridge device 130 may comprise a controller 132 and a controller 134. The controller 132 may comprise a transmission interface 1322, a transmission interface 1324 and a control unit 1326. The controller 134 may comprise a transmission interface 1342, a transmission interface 1344 and a control unit 1346. The transmission interface 1324 is coupled to the transmission interface 1342, so that the controller 132 can communicate with the controller 134 through the transmission interface 1324 and the transmission interface 1342. The transmission interface 1322 is coupled to the second transmission interface 118, so that the bridge device 130 can communicate with the host system 110. The transmission interface 1344 is coupled to the first transmission interface 1242, so that the bridge device 130 can communicate with the data storage device 120. The control unit 1326 and the control unit 1346 can enable the controllers 132 and 134 to have corresponding functions by executing built-in program codes. The control units 1326 and 1346 can respectively comprise components, such as a microprocessor, a read-only memory, and a buffer memory, and are used to control the transmission and reception of signals and packets according to corresponding communication protocols between the transmission interface 1322 and the transmission interface 1324 and between the transmission interface 1342 and the transmission interface 1344, process the signals and packets to be transmitted or received, and execute and control the format conversion of signals and packets, so that the signals and packets can be transmitted in the correct data format through the corresponding transmission interface.

In one example, the second transmission interface 118 and the transmission interface 1322 can be but not limited to a PCIe interface or a USB interface, and the controller 132 can communicate with the host system 110 with the second transmission interface 118 through the transmission interface 1322 according to the corresponding PCIe or USB communication protocol. The first transmission interface 1242 and the transmission interface 1344 can be but not limited to UFS interfaces (that is, the data storage device 120 can be but not limited to a UFS device), and the controller 134 can communicate with the data storage device 120 with the first transmission interface 1242 through the transmission interface 1344 according to the corresponding UFS communication protocol. Therefore, the host system 110 can access the data storage device 120 through the bridge device 130, and the data storage device 120 can access the host memory buffer 50 through the bridge device 130.

Figure 4:
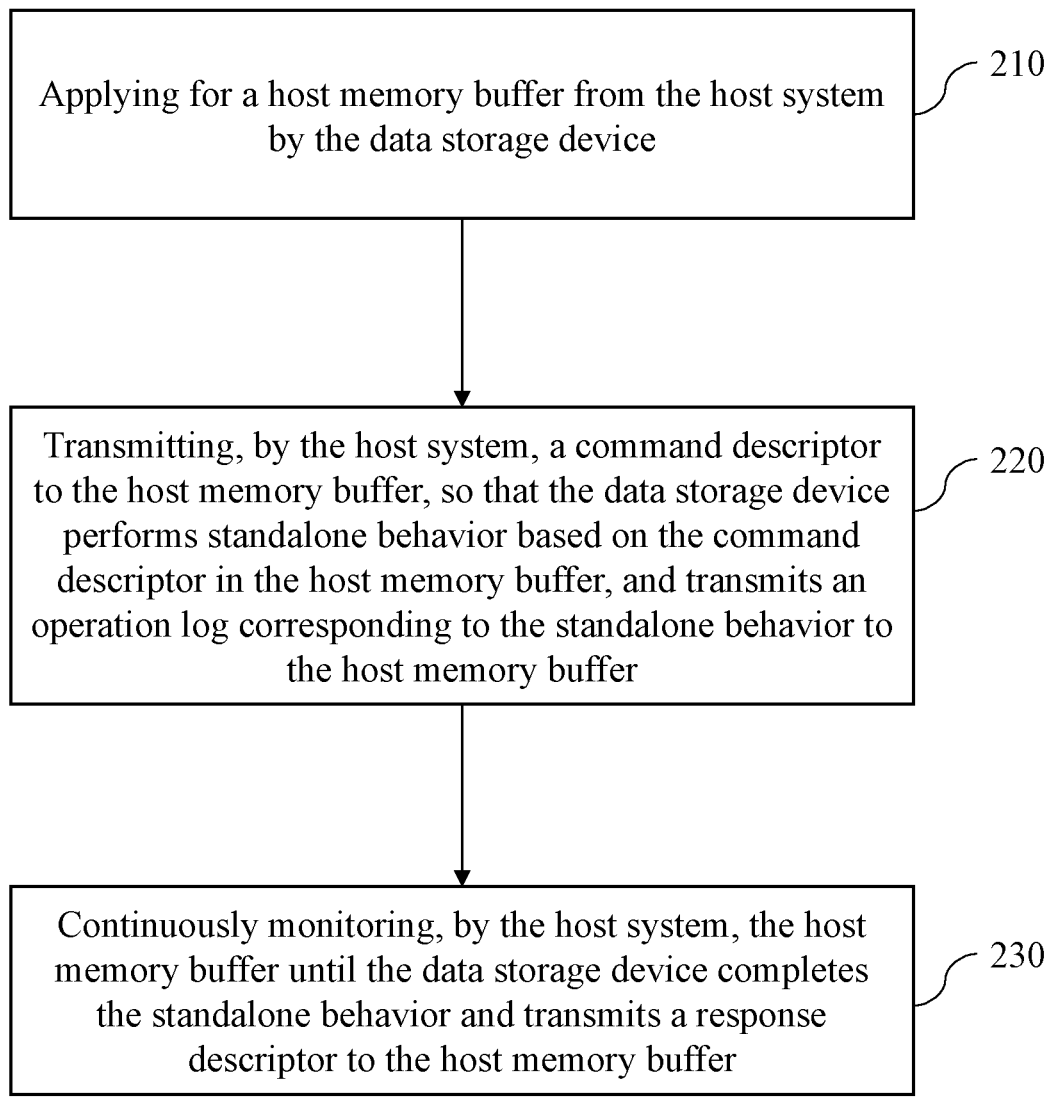
FIG. 4 is a flow chart of a handshaking method according to an embodiment of the present disclosure.

Please refer to FIG. 1 and FIG. 4, wherein FIG. 4 is a flow chart of a handshaking method according to an embodiment of the present disclosure. A handshaking method can be applied to the data storage system 100 shown in FIG. 1, and the handshaking method comprise the following steps: applying for a host memory buffer from the host system by the data storage device (step 210); transmitting, by the host system, a command descriptor to the host memory buffer, so that the data storage device performs standalone behavior based on the command descriptor in the host memory buffer, and transmits an operation log corresponding to the standalone behavior to the host memory buffer (step 220); and continuously monitoring, by the host system, the host memory buffer until the data storage device completes the standalone behavior and transmits a response descriptor to the host memory buffer (step 230). Therefore, the host memory buffer can be used as a communication interface between the host system and the data storage device, so that the transmission of commands is no longer limited to a specific transmission form, as a result, the data storage device can perform more diverse operations. The detailed description has been explained in the above paragraphs, and is not be repeated here.

In one embodiment, step 210 may comprise: requesting, by the data storage device, the host system to allocate the host memory buffer in a dynamic random access memory to the data storage device through a peripheral component interconnect express (PCIe) interface according to a non-volatile memory express (NVMe) protocol.

In one embodiment, when the host memory buffer comprises a command buffer, a log buffer and a response buffer as shown in FIG. 2, step 220 may comprise: transmitting, by the host system, the command descriptor to the command buffer; and performing, by the data storage device, the standalone behavior based on the command descriptor in the command buffer, generating a corresponding operation log, and transmitting the operation log to the log buffer, and step 230 may comprise: continuously monitoring, by the host system, the log buffer; transmitting, by the data storage device, the response descriptor to the response buffer after completing the standalone behavior; and stopping, by the host system, monitoring the log buffer when the response buffer is filled with the response descriptor. The detailed description has been explained in the above paragraphs, and is not be repeated here.

In one embodiment, when the host memory buffer comprises a command buffer, a log buffer and a response buffer as shown in FIG. 2, and the handshaking method is applied to a scenario where the host system controls the data storage device to execute a self-test operation, step 220 may comprise: transmitting, by the host system, a test command to the command buffer; and executing, by the data storage device, a self-test operation after extracting a test command in the command buffer, generating test information, and transmitting the test information to the log buffer; and step 230 may comprise: continuously monitoring, by the host system, the log buffer; updating, by the data storage device, a test result in the response buffer after completing the self-test operation; and stopping, by the host system, monitoring the log buffer when the test result is updated. Therefore, the host memory buffer is used as the communication interface between the host system and the data storage device, and the host system transmits the test command to the command buffer to make the data storage device perform a self-test operation, so that the data storage device can update the status of the process of the self-test operation to the host system and perform a debugging operation at the same time. The detailed description has been explained in the above paragraphs, and is not be repeated here.

In one embodiment, when the host system is not equipped with a transmission interface that can support the transmission specification of the data storage device, the host system must access the data storage device through a specific bridge device, and the data storage device must access the host memory buffer through the specific bridge device. Therefore, when the handshaking method can be applied to the data storage system 100 shown in FIG. 3, step 210 may comprise: applying for, by the data storage device, the host memory buffer to the host system through the first transmission interface via the bridging device and the second transmission interface; step 220 may comprise: transmitting, by the host system, the command descriptor to the host memory buffer, so that the data storage device performs the standalone behavior after extracting the command descriptor in the host memory buffer through the first transmission interface via the bridge device and the second transmission interface, and transmits the corresponding operation log to the host memory buffer through the first transmission interface via the bridging device and the second transmission interface; and step 230 may comprise: continuously monitoring, by the host system, the host memory until the data storage device completes the standalone behavior and transmits the response descriptor to the host memory buffer through the first transmission interface via the bridging device and the second transmission interface. The detailed description has been explained in the above paragraphs, and is not be repeated here.

To sum up, in the handshaking method and the data storage system of the present disclosure, the host memory buffer can be used as a communication interface between the host system and the data storage device, so that the transmission of commands is no longer limited to a specific transmission form, as a result, the data storage device can perform more diverse operations. In addition, the host memory buffer is used as the communication interface between the host system and the data storage device, and the host system transmits the test command to the command buffer to make the data storage device perform a self-test operation, so that the data storage device can update the status of the process of the self-test operation to the host system and perform a debugging operation at the same time.

While the present disclosure has been described using the above embodiments, it should be noted that these descriptions are not configured to limit the present disclosure. On the contrary, the present disclosure covers modifications and similar arrangements obvious to those skilled in the art. Therefore, the appended claims should be interpreted in the broadest manner, to include all obvious modifications and similar arrangements.

What is claimed is:

1. A handshaking method applied to a data storage system, the data storage system comprising a host system and a data storage device, the handshaking method comprising the following steps:
   (A) applying for a host memory buffer from the host system by the data storage device;
   (B) transmitting, by the host system, a command descriptor to the host memory buffer, so that the data storage device performs standalone behavior based on the command descriptor in the host memory buffer, and transmits an operation log corresponding to the standalone behavior to the host memory buffer; and
   (C) continuously monitoring, by the host system, the host memory buffer until the data storage device completes the standalone behavior and transmits a response descriptor to the host memory buffer.

2. The handshaking method according to claim 1, wherein the host memory buffer comprises a command buffer, a log buffer and a response buffer; step (B) comprises: transmitting, by the host system, the command descriptor to the command buffer; and performing, by the data storage device, the standalone behavior based on the command descriptor in the command buffer, generating a corresponding operation log, and transmitting the operation log to the log buffer; and step (C) comprises: continuously monitoring, by the host system, the log buffer; transmitting, by the data storage device, the response descriptor to the response buffer after completing the standalone behavior; and stopping, by the host system, monitoring the log buffer when the response buffer is filled with the response descriptor.

3. The handshaking method according to claim 1, wherein the host memory buffer comprises a command buffer, a log buffer, and a response buffer; step (B) comprises: transmitting, by the host system, a test command to the command buffer; and executing, by the data storage device, a self-test operation after extracting a test command in the command buffer, generating test information, and transmitting the test information to the log buffer; and step (C) comprises: continuously monitoring, by the host system, the log buffer; updating, by the data storage device, a test result in the response buffer after completing the self-test operation; and stopping, by the host system, monitoring the log buffer when the test result is updated.

4. The handshaking method according to claim 1, wherein step (A) comprises: requesting, by the data storage device, the host system to allocate the host memory buffer in a dynamic random access memory to the data storage device through a peripheral component interconnect express (PCIe) interface according to a non-volatile memory express (NVMe) protocol.

5. The handshaking method according to claim 1, wherein the data storage system further comprises a bridge device coupling with the data storage device and the host system; the data storage device comprises a first transmission interface, the host system comprises a second transmission interface, the second transmission interface is coupled to the host memory buffer, and a communication protocol corresponding to the first transmission interface is different from a communication protocol corresponding to the second transmission interface; step (A) comprises: applying for, by the data storage device, the host memory buffer to the host system through the first transmission interface via the bridging device and the second transmission interface; step (B) comprises: transmitting, by the host system, the command descriptor to the host memory buffer, so that the data storage device performs the standalone behavior after extracting the command descriptor in the host memory buffer through the first transmission interface via the bridge device and the second transmission interface, and transmits the corresponding operation log to the host memory buffer through the first transmission interface via the bridging device and the second transmission interface; and step (C) comprises: continuously monitoring, by the host system, the host memory until the data storage device completes the standalone behavior and transmits the response descriptor to the host memory buffer through the first transmission interface via the bridging device and the second transmission interface.

6. A data storage system, comprising:
a host system configured to transmit a command descriptor to a host memory buffer, and continuously monitor the host memory buffer until the host memory buffer is filled with a response descriptor; and
a data storage device coupled to the host system, and configured to apply for the host memory buffer from the host system, perform standalone behavior based on the command descriptor in the host memory buffer, and then transmit an operation log correspondingly generated to the host memory buffer, and transmit the response descriptor to the host memory buffer after completing the standalone behavior.

7. The data storage system according to claim 6, wherein the host memory buffer comprises a command buffer, a log buffer and a response buffer; the host system is further configured to transmit the command descriptor to the command buffer, and continuously monitor the log buffer until the response buffer is filled with the response descriptor; the data storage device is further configured to perform the standalone behavior based on the command descriptor in the command buffer, generate the operation log corresponding thereto, transmit the operation log to the log buffer, and transmit the response descriptor to the response buffer after completing the standalone behavior.

8. The data storage system according to claim 6, wherein the host memory buffer comprises a command buffer, a log buffer, and a response buffer; the host system is further configured to transmit a test command to the command buffer, and continuously monitor the log buffer until a test result of the response buffer is updated; the data storage device is further configured to execute a self-test operation after extracting the test command in the command buffer, generate test information, and transmit the test information to the log buffer, and update the test result in the response buffer after the self-test operation is completed.

9. The data storage system according to claim 8, wherein the self-test operation is a NAND flash test or a memory test.

10. The data storage system according to claim 6, wherein the data storage device is further configured to request the host system to allocate the host memory buffer in a dynamic random access memory to the data storage device through a peripheral component interconnect express (PCIe) interface according to a non-volatile memory express (NVMe) protocol.

11. The data storage system according to claim 6, wherein the data storage system further comprises a bridge device coupling with the data storage device and the host system; the data storage device comprises a first transmission interface, the host system comprises a second transmission interface, the second transmission interface is coupled to the host memory buffer, and a communication protocol corresponding to the first transmission interface is different from a communication protocol corresponding to the second transmission interface; the data storage device is further configured to communicate with the host system with the second transmission interface via the bridge device through the first transmission interface, and access the host memory buffer.

12. The data storage system according to claim 11, wherein the first transmission interface is a universal flash storage (UFS) interface, and the second transmission interface is a PCIe interface or a universal serial bus (USB) interface.

* * * * *